US011375222B2

(12) United States Patent
Li et al.

(10) Patent No.: US 11,375,222 B2
(45) Date of Patent: Jun. 28, 2022

(54) METHOD AND DEVICE FOR VIDEO ENCODING AND DECODING WITH INTERPOLATION FILTER FLAG BEING CONSISTENT WITH MMVD DISTANCES

(71) Applicant: Tencent America LLC, Palo Alto, CA (US)

(72) Inventors: Guichun Li, Milpitas, CA (US); Xiang Li, Saratoga, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/022,008

(22) Filed: Sep. 15, 2020

(65) Prior Publication Data
US 2021/0092425 A1    Mar. 25, 2021

Related U.S. Application Data

(60) Provisional application No. 62/904,417, filed on Sep. 23, 2019, provisional application No. 62/903,868, filed on Sep. 22, 2019.

(51) Int. Cl.
*H04N 19/46*    (2014.01)
*H04N 19/132*    (2014.01)
(Continued)

(52) U.S. Cl.
CPC ........... *H04N 19/46* (2014.11); *H04N 19/105* (2014.11); *H04N 19/132* (2014.11);
(Continued)

(58) Field of Classification Search
None
See application file for complete search history.

(56) References Cited

U.S. PATENT DOCUMENTS

2018/0098066 A1* 4/2018 Lee ...................... H04N 19/176
2019/0387247 A1* 12/2019 Huang ................... H04N 19/52
(Continued)

OTHER PUBLICATIONS

Benjamin Bross et al., "Versatile Video Coding (Draft 6)," Joint Video Experts Team (JVET) of ITU-T SG 16 WP 3 and ISO/IEC JTC 1/SC 29/WG 11, Jul. 2019, JVET-O2001-vE. 455 pages.
(Continued)

*Primary Examiner* — Stefan Gadomski
(74) *Attorney, Agent, or Firm* — Anova Law Group, PLLC (57) ABSTRACT

A method for video decoding includes: receiving an encoded block of video data for a current block; receiving signaling information associated with the current block, the signaling information indicating that a merge-with-motion-vector-difference (MMVD) mode is used in encoding the current block; performing a conformation reconfiguration to cause an alternative half-sample interpolation filter flag to be consistent with one or more distance values of an MMVD candidate, the conformation reconfiguration including reconfiguration of one or more of: the alternative half-sample interpolation filter flag, or the one or more distance values of the MMVD candidate; and reconstructing the current block according to the encoded block and the alternative half-sample interpolation filter flag.

11 Claims, 6 Drawing Sheets

(51) Int. Cl.
*H04N 19/80* (2014.01)
*H04N 19/176* (2014.01)
*H04N 19/51* (2014.01)
*H04N 19/186* (2014.01)
*H04N 19/105* (2014.01)

(52) U.S. Cl.
CPC ......... *H04N 19/176* (2014.11); *H04N 19/186* (2014.11); *H04N 19/51* (2014.11); *H04N 19/80* (2014.11)

(56) References Cited

U.S. PATENT DOCUMENTS

| | | | |
|---|---|---|---|
| 2020/0021845 A1* | 1/2020 | Lin | H04N 19/167 |
| 2020/0077106 A1* | 3/2020 | Jhu | H04N 19/176 |
| 2020/0275117 A1* | 8/2020 | Jeong | H04N 19/13 |
| 2020/0366924 A1* | 11/2020 | Rusanovskyy | H04N 19/52 |
| 2021/0006824 A1* | 1/2021 | Jeong | H04N 19/52 |
| 2021/0211705 A1* | 7/2021 | Lee | H04N 19/176 |
| 2021/0218955 A1* | 7/2021 | Lee | H04N 19/176 |

OTHER PUBLICATIONS

Jianle Chen et al., "Algorithm description for Versatile Video Coding and Test Model 6 (VTM 6)," Joint Video Experts Team (JVET) of ITU-T SG 16 WP 3 and ISO/IEC JTC 1/SC 29/WG 11, Jul. 2019, JVET-O2002-v2 87 pages.

* cited by examiner

METHOD AND DEVICE FOR VIDEO ENCODING AND DECODING WITH INTERPOLATION FILTER FLAG BEING CONSISTENT WITH MMVD DISTANCES

CROSS-REFERENCES TO RELATED APPLICATIONS

This application claims priority to U.S. Provisional Patent Application No. 62/903,868, filed on Sep. 22, 2019, and U.S. Provisional Patent Application No. 62/904,417, filed on Sep. 23, 2019, the contents of both of which are incorporated herein by reference in their entirety.

TECHNICAL FIELD

The present disclosure relates to the technical field of video encoding and decoding and, in particular, to method and device for video encoding and decoding in a merge with motion vector difference (MMVD) mode ensuring that an interpolation-filter flag is consistent with MMVD distances.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In October 2017, a Joint Call for Proposals on Video Compression with Capability beyond HEVC (CfP) was issued. In 2018, JVET formally launched the standardization of next-generation video coding beyond HEVC, i.e., the so-called Versatile Video Coding (VVC).

Various motion vector (MV) prediction mechanisms for video compression are described in H.265/HEVC standard and in the further developed VVC standard. Among these prediction mechanisms include a merge mode for inter-picture prediction, an affine mode for generating control point motion vector of the current coding unit (CU) based on the motion information of the spatial neighboring CUs, a subblock-based temporal MV prediction, a history-based MV prediction, pairwise average MV candidates, merge with Motion Vector Difference (MMVD), adaptive motion vector resolution, and alternative half-sample interpolation filter. However, under the MMVD mode, the inheritance of alternative half-sample interpolation flag may be inconsistent with MMVD distances.

SUMMARY

In one aspect of the present disclosure, a method for video decoding performed by a video decoder is provided. The method includes: receiving an encoded block of video data for a current block; receiving signaling information associated with the current block, the signaling information indicating that a merge-with-motion-vector-difference (MMVD) mode is used in encoding the current block; performing a conformation reconfiguration to cause an alternative half-sample interpolation filter flag to be consistent with one or more distance values of an MMVD candidate, the conformation reconfiguration including reconfiguration of one or more of: the alternative half-sample interpolation filter flag, or the one or more distance values of the MMVD candidate; and reconstructing the current block according to the encoded block and the alternative half-sample interpolation filter flag.

In another aspect of the present disclosure, a method for video encoding is provided. The method includes: encoding video data in an MMVD mode to generate an encoded block for a current block; and generating signaling information associated with the current block, including performing a conformation reconfiguration to cause an alternative half-sample interpolation filter flag to be consistent with one or more distance values of an MMVD candidate.

In another aspect of the present disclosure, a video decoder for video decoding is provided. The video decoder includes: a memory, storing computer-executable instructions; and a processor, coupled with the memory and, when the computer-executable instructions being executed, configured to: receive an encoded block of video data for a current block; receiving signaling information associated with the current block, the signaling information indicating that an MMVD mode is used in encoding the current block; perform a conformation reconfiguration to cause an alternative half-sample interpolation filter flag to be consistent with one or more distance values of an MMVD candidate, the conformation reconfiguration including reconfiguration of one or more of: the alternative half-sample interpolation filter flag, or the one or more distance values of the MMVD candidate; and reconstruct the current block according to the encoded block and the alternative half-sample interpolation filter flag.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure. Other drawings may be obtained by those of ordinary skill in the art based on these drawings.

DETAILED DESCRIPTION

The technical solutions according to the embodiments of the present disclosure described in the following with reference to the accompanying drawings. The described embodiments are only part of the embodiments of the present disclosure, but not all the embodiments. All other embodiments obtained by a person of ordinary skill in the art based on the embodiments of the present disclosure without creative efforts are within the scope of the present disclosure.

Certain acronyms and terms used in this disclosure are listed as follows. Other acronyms and/or terms not listed may be found from H.265/HEVC, the VVC standard, or other related documents.

AMVP Advanced MVP (where the best predictor for each motion block is signaled to the decoder)
AMVR Adaptive motion vector resolution
BDOF Bi-directional optical flow
CPMV control point motion vector
CPMV Control point motion vector
CPMVP Control point motion vector prediction
CU Coding unit
DMVR Decoder-side motion vector refinement
FIFO first-in, first-out
HEVC High efficiency video coding
HMVP History-based motion vector predictor
IF Interpolation filter
LIC Local illumination compensation
MMVD Merge with motion vector difference
MV Motion vector
MVD Motion vector difference
MVP Motion vector predictor
PROF Prediction refinement with optical flow
PU Prediction unit
SbTMVP Subblock-based temporal Motion vector predictor
TMVP Temporal Motion vector predictor
VPDU Virtual pipeline data units
VTM Versatile test model
VTM3 VVC Test Model 3
VVC Versatile video coding (beyond HEVC)

In the following description, the term block may be referred as a prediction block, a coding block, or a coding unit, i.e., a CU. Further, a MV component is at ½ luma sample position means that the fractional part of this MV component points to either ½ luma sample position or integer sample position.

Figure 1:
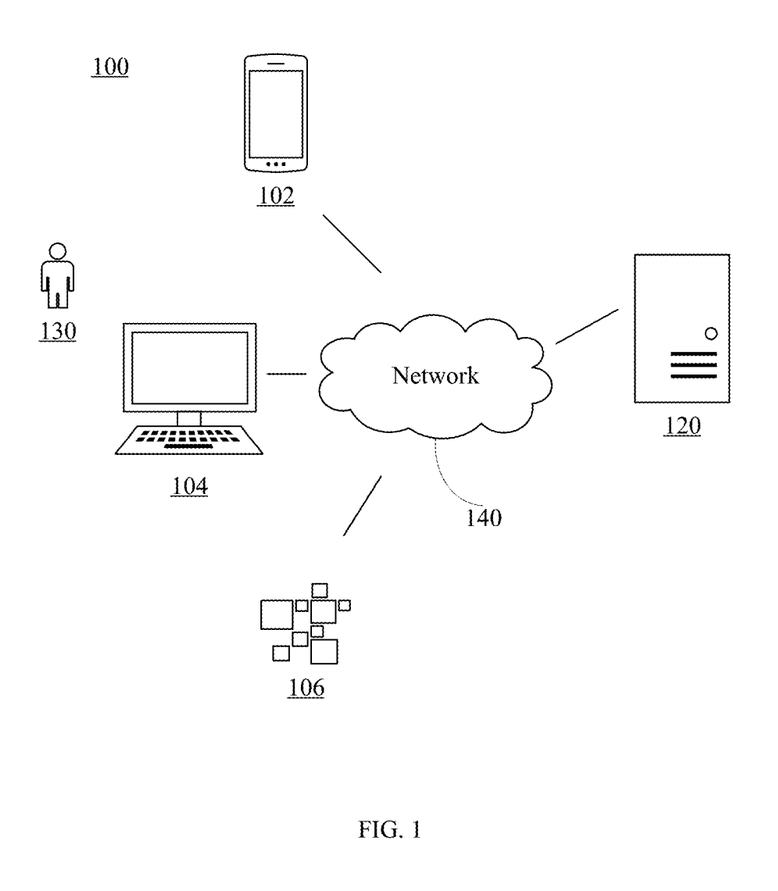
FIG. 1 illustrates an operating environment incorporating certain embodiments of the present disclosure.

FIG. 1 illustrates an operating environment 100 incorporating certain embodiments of the present disclosure. As shown in FIG. 1, the operating environment 100 may include a variety of devices with video functionalities. For example, the operating environment 100 may include a mobile device 102, a terminal device 104, and an electronic device 106. Other types of devices may also be included.

The operating environment 100 may also include a server 120, one or more users 130, and a communication network 140 connecting the variety of devices and the server 120. The user(s) 130 may use, access, or control one or more of the variety of devices.

The mobile device 102, the terminal device 104, and the electronic device 106 may be generally referred as a terminal device, which may include any user terminal, such as a personal digital assistant (PDA), a mobile phone, a smart phone, an integrated messaging device (IMD), a tablet computer, a notebook computer, a desktop computer, and other computing devices. The terminal device may also include any image or video capturing devices, such as a digital camera, a video camera, a security camera, a vehicle on-board camera, and a stereo camera, etc., or any electronic device with a video function, such as a digital doorbell, an autonomous driving sensor, a digital voice assistant, a smart speaker, a smart appliance, or any industrial or commercial IoT systems with video processing capability. Any of the mobile device 102, terminal device 104, and electronic device 106 may be stationary or mobile when carried by an individual who is moving, and may also be located as a part or in a mode of transport including a car, a truck, a taxi, a bus, a train, a boat, an airplane, a bicycle, a motorcycle or any similar suitable mode of transport.

The network 140 may include any appropriate type of communication network and may comprise any combination of wired or wireless networks including, but not limited to a wireless cellular telephone network, a wireless local area network (WLAN), a Bluetooth personal area network, an Ethernet local area network, a token ring local area network, a wide area network, and the Internet. The network 140 may also include private or public cloud computing platform for voice/data communication. When the Internet or other type of network is included, connectivity to the Internet may include long range wireless connections, short range wireless connections, and various wired connections including telephone lines, cable lines, power lines, and similar communication pathways.

The server 120 may include any type of server computer system or multiple computer systems configured in a server cluster or distributed in different locations. The server 120 may also include a cloud server on a cloud computing platform. The server 120 may also be referred as a server entity, which may be integrated with any appropriate device (including the electronic device) for performing the disclosed server-side functionalities of video decoding and application processing.

Figure 2:
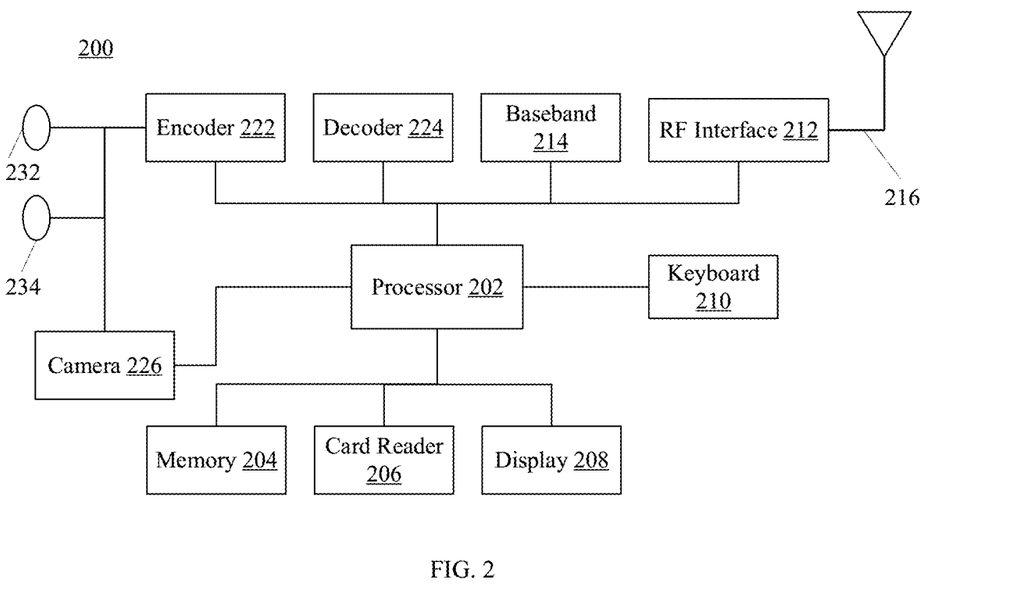
FIG. 2 illustrates an exemplary computer system implementing aspects of electronic devices according to certain embodiments of the present disclosure.

FIG. 2 illustrates an exemplary computer system implementing certain aspects of the variety of terminal devices 102, 104, and/or 106, and/or server 120. As shown in FIG. 2, the computer system 200 may include a hardware processor 202, a memory 204, a card reader 206, a display 208, a keyboard 210, a radio-frequency (RF) interface 212, a baseband 214, an antenna 216, an encoder 222, a decoder 224, a camera 226, a speaker 232, and a microphone 234, etc. The components shown in FIG. 2 are illustrative, certain components may be omitted, and other components may be added.

The processor 202 may be provided for controlling the computer system 200. The processor 202 may be connected to other components through one or more bus or other electrical connections to send data to and receive data from the other components. The processor 202 may include one or more processing cores, for example, a 4-core processor or an 8-core processor. The processor 202 may be implemented by using at least one hardware form of digital signal processing (DSP), a field-programmable gate array (FPGA), and a programmable logic array (PLA). The processor 202 may also include a main processor and a coprocessor. The main processor may be a central processing unit (CPU), and the coprocessor may be a graphics processing unit (GPU) configured to be responsible for rendering and drawing content that a display screen needs to display. In some embodiments, the processor 202 may further include an artificial intelligence (AI) processor. The AI processor is configured to process a computing operation related to machine learning.

The memory 204 may include one or more computer-readable storage media, such as a high-speed random access memory and a nonvolatile memory, for example, one or more disk storage devices or flash storage devices. The memory 204 may store both data in the form of image and audio data and may also store instructions for the processor 202. The card reader 206 may include any type of portable card interface, such as a smart card interface, a communication card interface (e.g., near field communication (NFC) card), or a subscriber identifier module (STM) card or other card interface for providing user information and being suitable for providing authentication information for authentication and authorization of the user 130.

Further, the display 208 may be any suitable display technology suitable to display an image or video. For example, the display 208 may include a liquid crystal display (LCD) screen, an organic light-emitting diode (OLED) screen, or the like, and may be a touch screen. The keyboard 210 may include a physical or virtual keyboard to input information by the user, and may also include other types of input/output devices. The speaker 232 and the microphone 234 may be used to input and output audio for the computer system 200.

The RF interface 212 (together with the antenna 216) may include RF circuitry for receiving and transmit RF signals. The RF interface 212 may convert an electrical signal to an electromagnetic signal for transmission or convert a received electromagnetic signal into an electrical signal for receiving. The RF interface 212 may communicate with other electronic devices through at least one wireless communication protocol. The wireless communication protocol may include a metropolitan area network, mobile communications networks (2G, 3G, 4G, and 5G) of various generations, a wireless local area network (LAN), and/or a wireless fidelity (WiFi) network. In some embodiments, the RF interface 212 may also include a circuit related to near field communication (NFC). The baseband 214 may include circuitry for processing the signals to and from the RF interface 212.

Further, the camera 226 may include any type of imaging or video capturing device configured to collect an image or a video. When the computer system 200 is a portable device carried by the user, the camera 226 may include a front-facing camera and a rear-facing camera. The front-facing camera may be disposed on the front panel of the electronic device, and the rear-facing camera is disposed on a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera 226 may further include a flash.

The encoder 222 and the decoder 224 may be referred as the codec circuitry of the electronic device suitable for carrying out coding and decoding of audio and/or video data or assisting in coding and decoding carried out by the processor 202.

The computer system 200 as shown in FIG. 2 may also include additional structures to implement any particular system. For example, the computer system 200 may include a database, and/or a land-line based network communication interface when implementing the server 120, or may include structures similar to those of a mobile terminal or user equipment of a wireless communication system when implementing the mobile device 102, etc. However, the computer system 200 may include or omit any structure to implement any electronic device or apparatus which may require encoding and decoding, or encoding or decoding video.

Returning to FIG. 1, the computer system 200 (i.e., any one or more of the variety of devices 102, 104, and/or 106) may capture or collect various data (e.g., audio data, environment/operating data, image data, and/or video data) and send the data to the server 120 through the network 140. The computer system 200 may process or pre-process the data before sending the data to the server 120, or may send the unprocessed data to the server 120.

During operation, a user of a terminal device may use a video application to transmit and/or receive video content to and/or from server 120, or users of the various terminal devices may use various video applications to communicate video content with each other. In one embodiment, one user may communicate video content with another user via the server 120, or the server 120 may set up the communication channel between the users, so that one user may direct communicate video with the other user via the communication channel.

Figure 3:
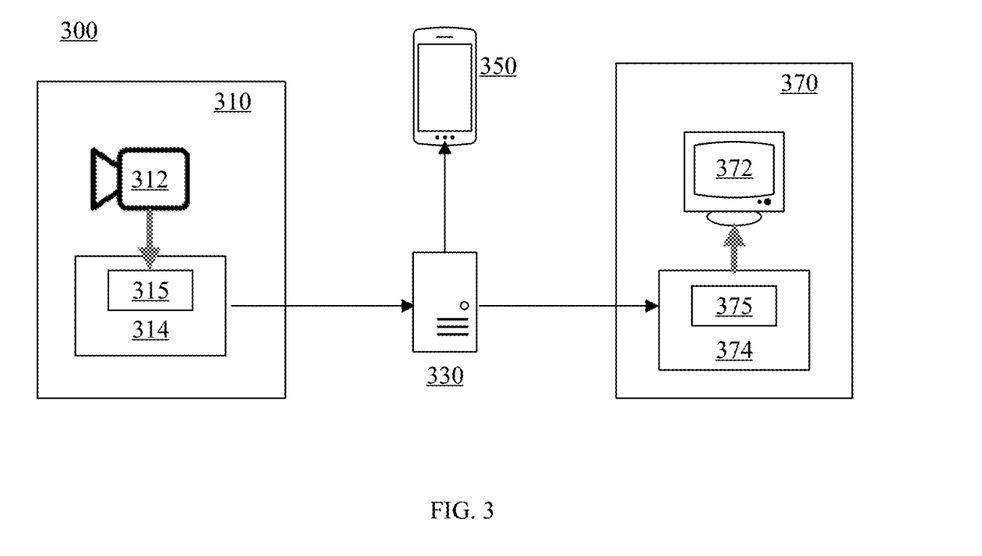
FIG. 3 illustrates an example for a video streaming application according to certain embodiments of the present disclosure.

FIG. 3 illustrates an example for a video streaming application of the present disclosure. The method and device provided by the present disclosure may be equally applicable to other video enabled applications, including, for example, video conferencing, digital TV, storing of compressed video on digital media including CD, DVD, memory stick and the like, and so on.

As shown in FIG. 3, a streaming system 300 may include a video source unit 310, a streaming server 330, a first client streaming device 350, and a second client streaming device 370. The video source unit 310 may include a video capture device 312, for example a digital camera or a digital camcorder, configured to acquire video data stream in an uncompressed format. The video data stream in the uncompressed format may have a high data volume compared to encoded video stream data. The video source unit 310 may further include a video processing unit 314 that implements a video encoder 315. The video encoder 315 may include hardware, software, or a combination thereof to enable or implement aspects of the present disclosure as described in more detail below. The video encoder 315 is configured to process the video stream data in the uncompressed format to generate encoded video stream data. The encoded video stream data has a lower data volume compared to the uncompressed video stream data, and may be transmitted to and stored on a streaming server 330 for live broadcast or on-demand broadcast. Client streaming devices, such as the first client streaming device 350 and second client streaming device 370, can access the streaming server 330 to retrieve copies of the encoded video steam data. The client streaming device 370 may include a video decoder 375, for example, implemented by a video processing unit 374. The video decoder 375 decodes the incoming copy of the encoded video stream data and creates an outgoing stream of decoded video data that can be rendered on a display 372 (e.g., a display screen) or other rendering devices. In some streaming systems, the encoded video data can be encoded according to certain video coding/compression standards. Examples of those standards include ITU-T Recommendation H.265. In an example, the video data is encoded under a video coding standard informally known as Versatile Video Coding (VVC). Specifically, the video data may be encoded in an MMVD mode, and the encoded video stream data includes encoded blocks of video data and signaling information associated with the blocks.

The encoding process includes intra-picture and inter-picture prediction and 2D transform coding. The encoder may split a video frame into block shaped regions for a first picture, or a first picture of a random access point, and use intra-picture prediction of the blocks based only on the information in that picture. For other pictures, inter-picture prediction is used, in which prediction information is used from other pictures. A merge mode may be used for inter-picture prediction. In the merge mode, where a merge flag (including skip flag) is signaled as true, a merge candidate list of candidate motion parameters from neighboring blocks is constructed. Then, an index is signaled which identifies the candidates to be used. Merge mode also allows for temporal prediction by including a candidate obtained from previously coded pictures in the list. At the decoder, merge candidate list is constructed based on spatial and temporal neighbors of the current block. Up to four spatially neighboring MVs may be added into merge candidate lists. In addition, up to one MV from two temporal co-located blocks, and additional merge candidates including combined bi-predictive candidates and zero motion vector candidates.

In HEVC, a skip mode may be used to indicate for a block that the motion data is inferred instead of explicitly signaled and that the prediction residual is zero, i.e., no transform coefficients are transmitted. In HEVC, at the beginning of each CU in an inter-picture prediction slice, a "skip_flag" may signaled that implies the following: the CU only contains one PU (2N×2N); the merge mode is used to derive the motion data; and no residual data is present in the bitstream.

Before taking the motion information of a block as a merge candidate, redundancy checks may be performed to check whether it is identical to an element in the current merge candidate list. If it is different from each element in the current merge candidate list, it will be added to the merge candidate list as a merge candidate. MaxMergeCandsNum is defined as the size of merge list in terms of candidate number. According to HEVC, MaxMergeCandsNum is signaled in bitstream.

Further, an affine merge prediction (AF_MERGE) mode may be applied for CUs with both width and height larger than or equal to 8. An affine motion model of a block may be determined based on motion vectors of control points of the block. In some implementations, the control points of the block are the top-left and top-right corners of the block. In some implementations, the control points of the block further include the bottom-left corner of the block. A video coder (i.e., a video encoder or a video decoder) may calculate motion vectors of sub-blocks of the block based on the motion vectors of the control points of the block.

In the affine merge mode, a video encoder and a video decoder identify a same affine source block for a current block. The affine source block may be an affine-coded block that spatially neighbors the current block. The video encoder and video decoder extrapolate the motion vectors of the control points of the current block from the motion vectors of the control points of the affine source block. For instance, the video encoder and the video decoder may construct an affine motion model that describes MVs of locations within the current block. The affine motion model is defined by a set of affine parameters. The video encoder and the video decoder may determine the affine parameters based on the motion vectors of the control points of the current block. The video encoder and the video decoder may determine the motion vectors of the control points of the current block based on motion vectors of control points of the affine source block. There can be up to five CPMVP candidates and an index may be signaled to indicate the one to be used for the current CU. Three types of CPMVP candidates are used to form the affine merge candidate list, including: inherited affine merge candidates extrapolated from the CPMVs of the neighbor CUs; constructed affine merge candidates CPMVPs derived using the translational MVs of the neighbor CUs; and zero MVs.

Figure 4A:
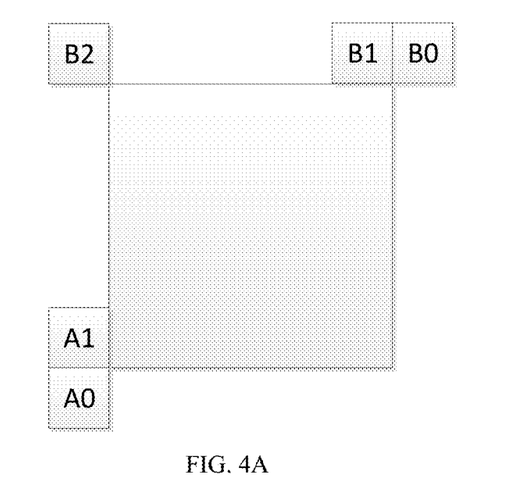
FIG. 4A illustrates locations of inherited affine motion predictors according to certain embodiments of the present disclosure.
Figure 4B:
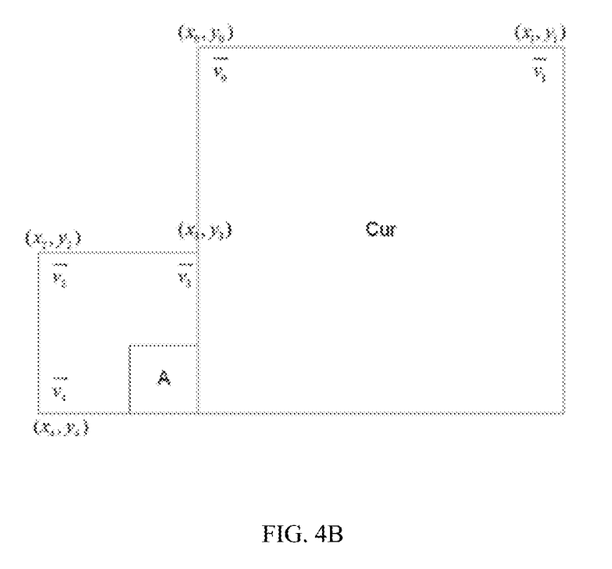
FIG. 4B illustrates control point motion vector inheritance according to certain embodiments of the present disclosure.

In VTM-3.0, there are maximum two inherited affine candidates, which are derived from the affine motion model of the neighboring blocks, one from left neighboring CUs and one from above neighboring CUs. The candidate blocks are shown in FIG. 4A. For the left predictor, the scan order is A0→A1, and for the above predictor, the scan order is B0→B1→B2. Only the first inherited candidate from each side is selected. No pruning check is performed between two inherited candidates. When a neighboring affine CU is identified, its CPMVs are used to derive the CPMVP candidate in the affine merge list of the current CU. As shown in FIG. 4B, if the neighbour left bottom block A is coded in affine mode, the motion vectors $v_2$, $v_3$ and $v_4$ of the top left corner, above right corner and left bottom corner of the CU which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Figure 4C:
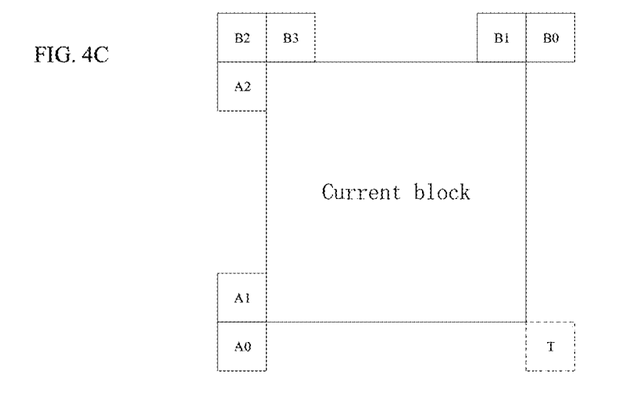
FIG. 4C illustrates locations of candidates in an affine merge mode according to certain embodiments of the present disclosure.

Constructed affine candidate means that the candidate is constructed by combining the neighbor translational motion information of each control point. The motion information for the control points is derived from the specified spatial neighbors and temporal neighbor, as shown in FIG. 4C. $CPMV_k$ (k=1, 2, 3, 4) represents the k-th control point. For $CPMV_1$, the B2→B3→A2 blocks are checked and the MV of the first available block is used. For $CPMV_2$, the B1→B0 blocks are checked and for $CPMV_3$, the A1→A0 blocks are checked. TMVP may be used as $CPMV_4$ if it's available.

After MVs of four control points are attained, affine merge candidates are constructed based on their motion information. The following combinations of control point MVs are used to construct in order:
$\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, $\{CPMV_1, CPMV_3\}$ The combination of three CPMVs construct a 6-parameter affine merge candidate and the combination of two CPMVs constructs a 4-parameter affine merge candidate. To avoid motion scaling process, if the reference indices of control points are different, the related combination of control point MVs is discarded.

VTM further supports subblock-based temporal motion vector prediction (SbTMVP) method. Similar to the temporal motion vector prediction (TMVP) in HEVC, SbTMVP uses motion field in a collocated picture to improve motion vector prediction and merge mode for CUs in the current picture. The same collocated picture used by TMVP may be used for SbTMVP. However, SbTMVP differs from TMVP in the following two main aspects. First, while TMVP predicts motion at CU level, SbTMVP predicts motion at sub-CU level. Second, while TMVP fetches temporal motion vectors from the collocated block in the collocated picture (the collocated block being the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 4D:
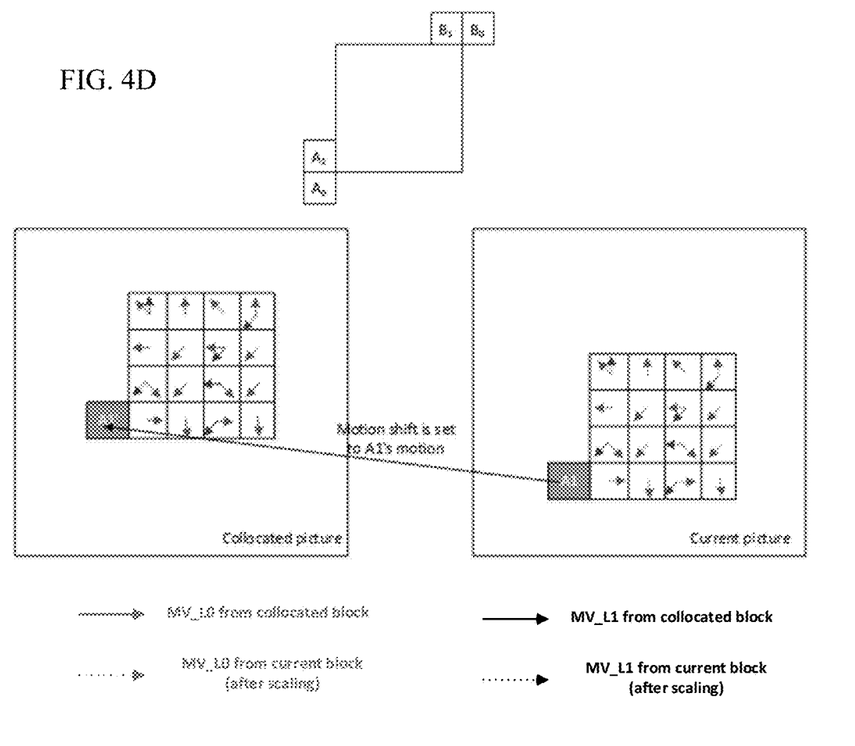
FIG. 4D illustrates an SbTMVP process of deriving sub-CU motion field by applying a motion shift from spatial neighbor and scaling the motion information from the corresponding collocated sub-CUs according to certain embodiments of the present disclosure.

The SbTMVP process is illustrated in FIG. 4D. SbTMVP predicts the motion vectors of the sub-CUs within the current CU in two steps. In the first step, the spatial neighbors shown in the top diagram of FIG. 4D are examined in the order of A1, B1, B and A0. As soon as and the first spatial neighboring block that has a motion vector that uses the collocated picture as its reference picture is identified, this motion vector is selected to be the motion shift to be applied. If no such motion is identified from the spatial neighbors, then the motion shift is set to (0, 0).

In the second step, the motion shift identified in the first step is applied (i.e. added to the current block's coordinates) to obtain sub-CU-level motion information (motion vectors and reference indices) from the collocated picture. The example shown in FIG. 4D assumes that the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VTM-3.0, a combined sub-block based merge list which contains both SbTMVP candidate and affine merge candidates is used for the signaling of sub-block based merge mode. The SbTMVP mode is enabled/disabled by a sequence parameter set (SPS) flag. If the SbTMVP mode is enabled, the SbTMVP predictor is added as the first entry of the list of sub-block based merge candidates, and followed by the affine merge candidates. The maximum allowed size of the sub-block based merge list is 5 in VTM-3.0.

The sub-CU size used in SbTMVP is fixed to be 8×8, and as done for affine merge mode, SbTMVP mode is only applicable to the CU with both width and height are larger than or equal to 8. The encoding logic of the additional SbTMVP merge candidate is the same as for the other merge candidates, that is, for each CU in P or B slice, an additional RD check is performed to decide whether to use the SbTMVP candidate.

Figure 5:
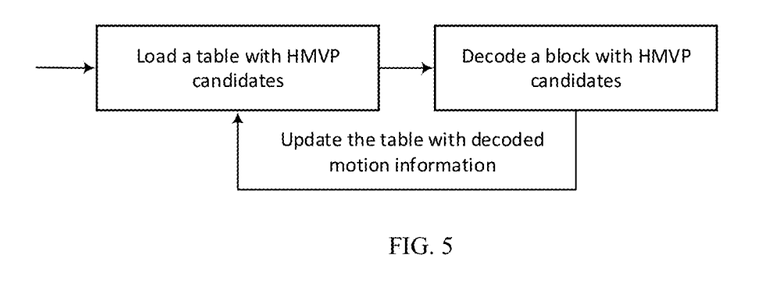
FIG. 5 illustrates a process of decoding in an HMVP mode according to certain embodiments of the present disclosure.

VTM-3.0 further supports a history-based MVP (HMVP) method, wherein a HMVP candidate is defined as the motion information of a previously coded block. A table with multiple HMVP candidates is maintained during the encoding/decoding process. The table is emptied when a new slice is encountered. Whenever there is an inter-coded non-affine block, the associated motion information is added to the last entry of the table as a new HMVP candidate. The overall coding flow is depicted in FIG. 5.

In VTM-3.0, the table size S is set to be 6, which indicates up to 6 HMVP candidates may be added to the table. When inserting a new motion candidate to the table, a constrained FIFO rule is utilized wherein redundancy check is firstly applied to find whether there is an identical HMVP in the table. If found, the identical HMVP is removed from the table and all the HMVP candidates afterwards are moved forward, i.e., with indices reduced by 1.

HMVP candidates may be used in the merge candidate list construction process. The latest several HMVP candidates in the table are checked in order and inserted to the candidate list after the TMVP candidate. Pruning is applied on the HMVP candidates to the spatial or temporal merge candidate excluding sub-block motion candidate (i.e., SbTMVP).

To reduce the number of pruning operations, three simplifications are introduced:
1) Number of HMPV candidates to be check denoted by L is set as:

$$L=(N<=4)?M:(8-N)$$

wherein N is number of available non-sub block merge candidate and M is number of available HMVP candidates in the table.

2) In addition, once the total number of available merge candidates reaches the signaled maximally allowed merge candidates minus 1, the merge candidate list construction process from HMVP list is terminated.
3) Moreover, the number of pairs for combined bi-predictive merge candidate derivation is reduced from 12 to 6.

Similarly, HMVP candidates could also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates.

Pairwise average candidates may be generated by averaging predefined pairs of candidates in the current merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures. If only one motion vector is available, it is used directly. If no motion vector is available, the list is kept invalid. The pairwise average candidates replace the combined candidates in HEVC standard. In some previously proposed methods and in current VVC standard, only one predefined pair {(0, 1)} is used to generate the pairwise average MV candidates.

In addition to merge mode, where the implicitly derived motion information is directly used for prediction samples generation of the current CU, the merge mode with motion vector differences (MMVD) is included in VVC. An MMVD flag may be signaled right after sending a skip flag and merge flag to specify whether MMVD mode is used for a CU.

In MMVD, after a merge candidate is selected, it is further refined by the signaled MVDs information. The further information includes a merge candidate flag, an index to specify motion magnitude, and an index for indication of motion direction. In MMVD mode, one of the first two candidates in the merge list is selected to be used as MV basis. The merge candidate flag is signaled to specify which one is used.

Distance index specifies motion magnitude information and indicate the pre-defined offset from the starting point. An offset may be added to either horizontal component or vertical component of starting MV. The relation of distance index and pre-defined offset is specified in the MMVD distance table (Table 1). The first row of the MMVD distance table lists distance indexes. The second row of the MMVD distance table lists offsets of MVs in unit of luma samples when the full-pel MMVD flag is off. The third row of the modified MMVD distance table lists offsets of the MVs in unit of luma samples when the full-pel MMVD flag is on. When the full-pel MMVD flag slice_fpel_mmvd_enabled_flag is equal to 0, the range of MMVD offset are from ¼ luma samples to 32 luma samples; when slice_fpel_mmvd_enabled_flag is 1, the range of MMVD offset are from 1 luma sample to 128 luma samples.

TABLE 1

| Distance IDX | 0 | 1 | 2 | 3 | 4 | 5 | 6 | 7 |
|---|---|---|---|---|---|---|---|---|
| Offset (in unit of luma sample) Full-pel MMVD off | ¼ | ½ | 1 | 2 | 4 | 8 | 16 | 32 |

TABLE 1-continued

| Distance IDX | 0 | 1 | 2 | 3 | 4 | 5 | 6 | 7 |
|---|---|---|---|---|---|---|---|---|
| Offset (in unit of luma sample) Full-pel MMVD on | 1 | 2 | 4 | 8 | 16 | 32 | 64 | 128 |

Direction index represents the direction of the MVD relative to the starting point. The direction index can represent of the four directions as shown in Table 2. It's noted that the meaning of MVD sign could be variant according to the information of starting MVs. When the starting MVs is a uni-prediction MV or bi-prediction MVs with both lists point to the same side of the current picture (i.e. POCs of two references are both larger than the POC of the current picture, or are both smaller than the POC of the current picture), the sign in Table 2 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 2 specifies the sign of MV offset added to the list0 MV component of starting MV and the sign for the list1 MV has opposite value.

TABLE 2

| Direction IDX | 00 | 01 | 10 | 11 |
|---|---|---|---|---|
| x-axis | + | − | N.A | NA |
| y-axis | N/A | N/A | + | − |

In HEVC, motion vector differences (MVDs) (between the motion vector and predicted motion vector of a CU) are signaled in units of quarter-luma-sample when use integer mv flag is equal to 0 in the slice header. In VVC, a CU-level adaptive motion vector resolution (AMVR) scheme may be included. AMVR allows MVD of the CU to be coded in different precision. Dependent on the mode (normal AMVP mode or affine AVMP mode) for the current CU, the MVDs of the current CU can be adaptively selected as shown in Table 3.

TABLE 3

| | AMVR = 0 | AMVR = 1 | AMVR = 2 | AMVR = 3 |
|---|---|---|---|---|
| Normal AMVP mode | ¼ pel | 1 pel | 4 pel | ½ pel |
| Affine AMVP mode | ¼ pel | ¹⁄₁₆ pel | 1 pel | — |
| IBC AMVP mode | — | 1 pel | 4 pel | — |

The CU-level MVD resolution indication is conditionally signaled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signaled to indicate whether quarter-luma-sample MVD precision is used for the CU. If the first flag is 0, no further signaling is needed and quarter-luma-sample MVD precision is used for the current CU. Otherwise, a second flag is signaled to indicate whether half-luma-sample is used, if the second flag is 0, no further signaling is needed and half-luma-sample MVD precision is used, and alternative half-sample interpolation filter will be used in motion compensation. Otherwise, a third flag is signaled to indicate whether integer-luma-sample or four-luma-sample MVD precision is used for normal AMVP CU. The same second flag is used to indicate whether integer-luma-sample or ¹⁄₁₆ luma-sample MVD precision is used for affine AMVP CU. In order to ensure the reconstructed MV has the intended precision (quarter-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

In normal AMVP mode, when AMVR precision is signaled to be ½ luma sample for a block, an alternative interpolation filter (IF) is used in motion compensation for that block. The half-sample interpolation-filter flag hpelIfIdx is used to indicate whether the alternative half-sample IF is used. The value of hpelIfIdx is derived as:

hpelIfIdx=AmvrShift==3?1:0

The alternative half-sample IF flag hpelIfIdx may be inherited during the inter merge process. The spatial inter merge candidates include hpelIfIdx flag along with other motion information. This inheritance of hpelIfIdx is also applied for MMVD mode, the flag is inherited from the base candidate. In the interpolation process, when the hpelIfIdx is equal to 1, and the fractional part of the corresponding MV component is equal to half sample, half-sample IF will be used in the interpolation process.

However, the inheritance of alternative half-sample interpolation flag in MMVD mode may have inconsistency issue. When the selected MMVD base candidate has half-sample precision MV and its alternative half-sample IF flag is equal to 1, the half-sample IF flag is inherited by the selected MMVD candidate, and MMVD MV offset is further applied to the MV of base candidate to generate the final MV. In case of the signaled MMVD distance is ¼ sample, the final MV is not in half-sample precision anymore, but its half-sample IF flag is still set to 1. Similarly, if the MMVD offset on a base candidate with bi-prediction is scaled, the final MV offset may be not in half-sample precision. In such cases, the interpolation on the block using this MMVD candidate may have mixed interpolation filter types applied. MV components with absolute value of fractional part equal to ½ sample will use the alternative half-sample IF; and if the MV components with fractional part has absolute value not equal to 0 or ½ sample, interpolation with such MV component will use regular 8-tap interpolation filter. The inconsistency issue may cause the complications in the decoding process.

Figure 6:
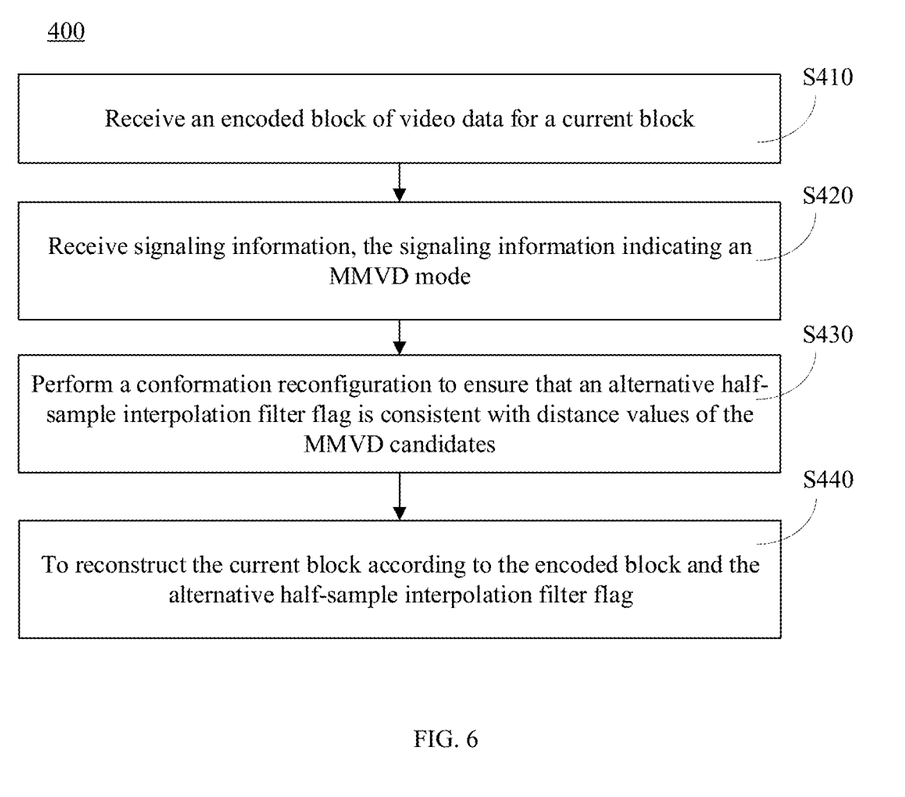
FIG. 6 illustrates a decoding method according to certain embodiments of the present disclosure.

In order to address the inconsistency issue in encoding and decoding in the MMVD mode, the present disclosure provides an encoding and/or decoding method and corresponding electronic devices that ensure the half-sample IF to be consistent with the distance values of the MMVD candidates. FIG. 6 shows a decoding method 400 applied by a decoder according to certain embodiments of the present disclosure. As shown in FIG. 6, the decoding method includes the following steps.

Step S410 is to receive an encoded block of video data for a current block. According to certain embodiments, the encoded video data includes a plurality of encoded blocks associated with a current image in a video. The blocks may be intra- and/o inter-coded. The decoder may receive the encoded blocks for performing decoding.

Step S420 is to receive signaling information associated with the current block, the signaling information indicating that an MMVD mode is used in encoding the current block. According to certain embodiments, the video data may be encoded in an MMVD mode. The encoded video data further includes signaling information. The signal information may include an MMVD flag that indicates the MMVD mode. The decoder may receive the signaling information, and according to the MMVD flag, performs decoding in the MMVD mode.

Step S430 is to perform a conformation reconfiguration to ensure that an alternative half-sample interpolation-filter flag is consistent with distance values of the MMVD candidates. According to certain embodiments, the conformation reconfiguration may include reconfiguring the alternative half-sample interpolation-filter flag, and/or the one or more distance values of the MMVD candidates.

According to certain embodiments, to ensure that the alternative half-sample interpolation-filter flag is consistent with distance values of the MMVD candidates, the alternative half-sample interpolation-filter flag is not inherited in MMVD candidates. Specifically, the current block's alternative half-sample IF flag value is set to 0 if MMVD mode is used.

Alternatively, according to certain other embodiments, the decoding method includes determining if the MMVD distance of a MMVD candidate is not at ½ sample position, that is, if the MMVD distance is greater than 0 and less than ½ sample. When the MMVD distance is greater than 0 and less than ½ sample, the alternative half-sample interpolation-filter flag is not inherited from the base candidate. Instead, the alternative half-sample IF flag value of the MMVD candidate is set to 0.

Alternatively, according to certain other embodiments, the decoder determines if any component of the final MV of a MMVD candidate is not at ½ luma sample position. And when any component of the final MV of a MMVD candidate is not at ½ luma sample position, the alternative half-sample interpolation-filter flag is not inherited from the base candidate. Instead, the alternative half-sample IF flag value of the MMVD candidate is set to 0.

Alternatively, according to certain other embodiments, the decoding method includes determining if a base candidate has alternative half-sample IF flag value equal to 1. When a base candidate has alternative half-sample IF flag value equal to 1, the MMVD distance table is modified to ensure that all the entries in the MMVD distance table has a value greater than or equal to ½ sample. All the MMVD candidates generated from this base candidate will use the modified MMVD distance table. Otherwise, if the base candidate has alternative half-sample IF flag equal to 0, the original MMVD distance table as described in Table 1 is used. In one example, when the base candidate has alternative half-sample IF flag equal to 1, the MMVD distance table may be modified as in Table 4. As shown in Table 4, all the entries in the MMVD distance table has a value greater than or equal to ½ sample.

TABLE 4

| Distance IDX | 0 | 1 | 2 | 3 | 4 | 5 | 6 | 7 |
|---|---|---|---|---|---|---|---|---|
| Offset (in unit of luma sample) Full-pel MMVD off | ½ | 1 | 2 | 4 | 8 | 16 | 32 | 64 |
| Offset (in unit of luma sample) Full-pel MMVD on | 1 | 7 | 4 | 8 | 16 | 32 | 64 | 128 |

Alternatively, according to certain other embodiments, the decoding method includes determining if the alternative half-sample interpolation filter is enabled. If the alternative half-sample interpolation filter is enabled, the decoder may only use a MMVD distance table with all the entries are larger than or equal to ½ sample. In one example, the MMVD distance table as described in Table 4 may be used.

Referring back to FIG. 6, Step S440 of the decoding method is to reconstruct the current block according to the encoded block and the alternative half-sample interpolation-filter flag. According to certain embodiments, the decoder may decode the current encoded block, including determining whether to apply the half-sample interpolation filter according to the alternative half-sample interpolation-filter flag.

Figure 7:
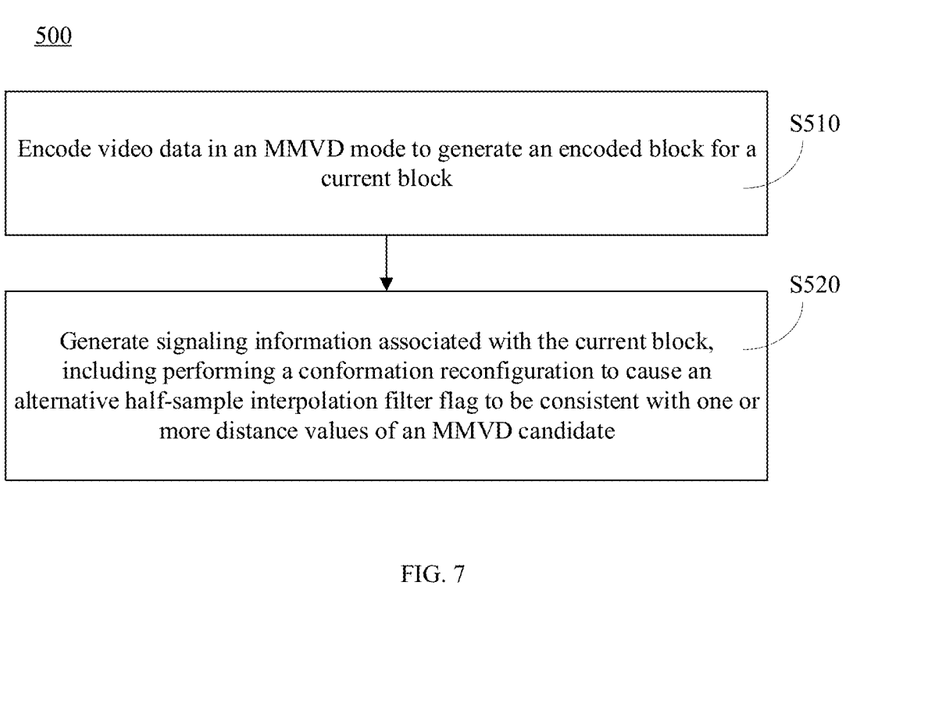
FIG. 7 illustrates an encoding method according to certain embodiments of the present disclosure.

Alternatively, a conformation reconfiguration may be performed by an encoder. As shown in FIG. 7, an encoding method 500 encodes video data in an MMVD mode and generates associated signaling information, and includes the following steps.

Step S510 is to encode video data in an MMVD mode to generate an encoded block for a current block. Step S520 is to generate signaling information associated with the current block, including performing a conformation reconfiguration to cause an alternative half-sample interpolation filter flag to be consistent with one or more distance values of an MMVD candidate.

In certain embodiments, if a base candidate has alternative half-sample IF flag value equal to 1, the bit stream conformance may be enforced by the encoder to ensure that MMVD distance with value smaller than ½ sample will not be selected by the encoder for the corresponding MMVD candidates. In certain other embodiments, if the base candidate associated with the MVD of the current block has an alternative half sample interpolation filter flag value equal to 1, the bit stream conformance may be enforced by the encoder to ensure that all components of final moving vectors (MVs) of a MMVD candidate are at ½ sample positions. When the bit stream conformance is performed by the encoder, a decoder may receive the encoded block and the signal information that comply with the stream conformance.

The different embodiments of the decoding method 400 and encoding method 500 may be combined in implementation. The decoding method 400 and encoding method 500 may be implemented by a respective decoder or encoder. Examples of the encoder and the decoder are illustrated in FIG. 2. The encoder 222 and the decoder 224 may be implemented as circuitry of the electronic device suitable for carrying out the encoding method 500 or the decoding method 400.

The present disclosure contains material that is subject to copyright protection. The copyright is the property of the copyright holder. The copyright holder has no objection to the reproduction of patent documents or patent disclosure in the official records and files of the Patent and Trademark Office.

What is claimed is:

1. A method for video decoding, comprising:
   receiving an encoded block of video data for a current block;
   receiving signaling information associated with the current block, the signaling information indicating that a merge-with-motion-vector-difference (MMVD) mode is used in encoding the current block;
   performing a conformation reconfiguration to cause an alternative half-sample interpolation filter flag to be consistent with one or more distance values of an MMVD candidate, the conformation reconfiguration including reconfiguration of one or more of: the alternative half-sample interpolation filter flag, or the one or more distance values of the MMVD candidate, wherein the conformation reconfiguration is performed by one or more of:
      determining whether the one or more distances of the MMVD candidate includes a distance greater than 0 and less than ½ sample; and in response to determining the one or more distances of the MMVD candidate includes the distance greater than 0 and less than ½ sample, assigning a value 0 to the alternative half-sample interpolation filter flag to indicate not to apply an alternative half-sample interpolation filter in a motion compensation in reconstructing the current block;
      determining whether the alternative half-sample interpolation filter flag associated with a base candidate equals to 1; and in response to determining the alternative half-sample interpolation filter flag associated with the base candidate equals to 1, using a modified MMVD distance table to ensure all distance values of the MMVD candidate being greater than or equal to ½ sample; and
      determining whether the half-sample interpolation filter is enabled; and in response to determining the half-sample interpolation filter is enabled, using the modified MMVD distance table to ensure all distance values of the MMVD candidate being greater than or equal to ½ sample; and
   reconstructing the current block according to the encoded block and the alternative half-sample interpolation filter flag.

2. The method according to claim 1, wherein performing the conformation reconfiguration includes:
   assigning a value 0 to the alternative half-sample interpolation filter flag to indicate not to apply an alternative half-sample interpolation filter in a motion compensation in reconstructing the current block.

3. The method according to claim 1, wherein performing the conformation reconfiguration includes:
   determining whether a final motion vector (MV) of a MMVD candidate is not at a ½ sample position; and
   in response to determining the final MV of the MMVD candidate is not at the ½ sample position, assigning a value 0 to the alternative half-sample interpolation filter flag to indicate not to apply an alternative half-sample interpolation filter in a motion compensation in reconstructing the current block.

4. The method according to claim 1, wherein the modified MMVIVD distance table is:

| Distance IDX | 0 | 1 | 2 | 3 | 4 | 5 | 6 | 7 |
|---|---|---|---|---|---|---|---|---|
| Offset (in unit of luma sample) Full-pel MMVD off | ½ | 1 | 2 | 4 | 8 | 16 | 32 | 64 |
| Offset (in unit of luma sample) Full-pel MMVD on | 1 | 2 | 4 | 8 | 16 | 32 | 64 | 128 | wherein a first row of the modified MMVD distance table lists distance indexes; a second row of the modified MMVD distance table lists offsets of moving vectors (MVs) in unit of luma samples when a full-pel MMVD flag is off; and a third row of the modified MMVD distance table lists offsets of the MVs in unit of luma samples when the full-pel MMVD flag is on.

5. The method according to claim 1, wherein: the encoded block and signaling information are generated by an encoder that performs a bit stream conformance in response to a base candidate associated with a moving vector difference (MVD) of the current block has the alternative half sample interpolation filter flag value equal to 1.

6. A method for video encoding, comprising:
   encoding video data in an MMVD mode to generate an encoded block for a current block; and
   generating signaling information associated with the current block, including performing a conformation reconfiguration to cause an alternative half-sample interpolation filter flag to be consistent with one or more distance values of an MMVD candidate, wherein the conformation reconfiguration is performed by:
      determining whether a base candidate associated with a motion vector difference (MVD) of the current block has an alternative half sample interpolation filter flag value equal to 1; and in response to the base candidate associated with the MVD of the current block has an alternative half sample interpolation filter flag value equal to 1, enforcing a bit stream conformance to cause MMVD distance with value smaller than ½ samples not to be selected for the corresponding MMVD candidates.

7. The method according to claim 6, wherein performing the conformation reconfiguration includes:
   in response to the base candidate associated with the MVD of the current block has an alternative half sample interpolation filter flag value equal to 1, enforcing a bit stream conformance to cause all components of final moving vectors (MVs) of a MMVD candidate are at ½ sample positions.

8. A video decoder for video decoding, comprising: a memory, storing computer-executable instructions; and a processor, coupled with the memory and, when the computer-executable instructions being executed, configured to:
   receive an encoded block of video data for a current block;
   receiving signaling information associated with the current block, the signaling information indicating that an MMVD mode is used in encoding the current block;
   perform a conformation reconfiguration to cause an alternative half-sample interpolation filter flag to be consistent with one or more distance values of an MMVD candidate, the conformation reconfiguration including reconfiguration of one or more of: the alternative half-sample interpolation filter flag, or the one or more distance values of the MMVD candidate, wherein the conformation reconfiguration is performed by one or more of:

determining whether the one or more distances of the MMVD candidate includes a distance greater than 0 and less than ½ sample; and in response to determining the one or more distances of the MMVD candidate includes the distance greater than 0 and less than ½ sample, assigning a value 0 to the alternative half-sample interpolation filter flag to indicate not to apply an alternative half-sample interpolation filter in a motion compensation in reconstructing the current block;

determining whether the alternative half-sample interpolation filter flag associated with a base candidate equals to 1; and in response to determining the alternative half-sample interpolation filter flag associated with the base candidate equals to 1, using a modified MMVD distance table to ensure all distance values of the MMVD candidate being greater than or equal to ½ sample; and determining whether the half-sample interpolation filter is enabled; and in response to determining the half-sample interpolation filter is enabled, using the modified MMVD distance table to ensure all distance values of the MMVD candidate being greater than or equal to ½ sample; and reconstruct the current block according to the encoded block and the alternative half-sample interpolation filter flag.

9. The video decoder according to claim 8, wherein performing the conformation reconfiguration includes:

assigning a value 0 to the alternative half-sample interpolation filter flag to indicate not to apply a half-sample interpolation filter in a motion compensation in reconstructing the current block.

10. The video decoder according to claim 8, wherein performing the conformation reconfiguration includes:

determining whether a final MV of a MMVD candidate is not at a ½ sample position; and in response to determining the final MV of the MMVD candidate is not at the ½ sample position, assigning a value 0 to the alternative half-sample interpolation filter flag to indicate not to apply a half-sample interpolation filter in a motion compensation in reconstructing the current block.

11. The video decoder according to claim 8, wherein the modified MMVD distance table is:

| Distance IDX | 0 | 1 | 2 | 3 | 4 | 5 | 6 | 7 |
|---|---|---|---|---|---|---|---|---|
| Offset (in unit of luma sample) Full-pel MMVD off | ½ | 1 | 2 | 4 | 8 | 16 | 32 | 64 |
| Offset (in unit of luma sample) Full-pel MMVD on | 1 | 2 | 4 | 8 | 16 | 32 | 64 | 128 | wherein a first row of the modified MMVD distance table lists distance indexes; a second row of the modified MMVD distance table lists offsets of moving vectors (MVs) in unit of luma samples when a full-pel MMVD flag is off; and a third row of the modified MMVD distance table lists offsets of the MVs in unit of luma samples when the full-pel MMVD flag is on.

* * * * *